US012456836B2

(12) United States Patent
Nozaki et al.

(10) Patent No.: US 12,456,836 B2
(45) Date of Patent: Oct. 28, 2025

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Nozaki, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 714 days.

(21) Appl. No.: 17/769,824

(22) PCT Filed: Aug. 7, 2020

(86) PCT No.: PCT/JP2020/030294
§ 371 (c)(1),
(2) Date: Apr. 18, 2022

(87) PCT Pub. No.: WO2021/079590
PCT Pub. Date: Apr. 29, 2021

(65) Prior Publication Data

US 2022/0376425 A1 Nov. 24, 2022

(30) Foreign Application Priority Data

Oct. 25, 2019 (JP) ................................ 2019-194020

(51) Int. Cl.
*H01R 13/436* (2006.01)
*H01R 13/422* (2006.01)
*H01R 13/506* (2006.01)

(52) U.S. Cl.
CPC ..... *H01R 13/4364* (2013.01); *H01R 13/4223* (2013.01); *H01R 13/506* (2013.01)

(58) Field of Classification Search
None
See application file for complete search history.

(56) References Cited

U.S. PATENT DOCUMENTS 5,139,447 A * 8/1992 Yoneda .............. H01R 13/4368 439/752
5,141,452 A * 8/1992 Yoneda .............. H01R 13/4368 439/752

(Continued)

FOREIGN PATENT DOCUMENTS

JP 2001-244014 A 9/2001
JP 2003-282188 A 10/2003

(Continued)

OTHER PUBLICATIONS

International Search Report issued on Sep. 8, 2020 for WO 2021/079590 A1 (5 pages).

*Primary Examiner* — Felix O Figueroa
(74) *Attorney, Agent, or Firm* — Venjuris, P.C.

(57) ABSTRACT

It is aimed to provide a connector having a function of protecting a male terminal and capable of coping with size reduction. A connector includes a guide, inside which a female housing is arranged, a cavity located behind the guide and communicating with inside of the guide, a holding member arranged movably in a front-rear direction with respect to the guide, and a male terminal arranged inside the cavity and including a tab projecting forward. The male (Continued)

terminal is provided to move integrally with the holding member.

4 Claims, 12 Drawing Sheets

(56) References Cited

U.S. PATENT DOCUMENTS

| | | | | | |
|---|---|---|---|---|---|
| 5,205,763 | A * | 4/1993 | Watanabe | H01R 13/4368 | 439/752 |
| 5,322,457 | A * | 6/1994 | Tsuji | H01R 13/4368 | 439/752 |
| 5,454,740 | A * | 10/1995 | Sakano | H01R 13/4368 | 439/752 |
| 6,146,200 | A | 11/2000 | Ito et al. | | |
| 7,419,409 | B2 * | 9/2008 | Machida | H01R 13/4367 | 439/852 |
| 7,670,177 | B2 * | 3/2010 | Myer | H01R 13/4365 | 439/595 |
| 10,637,188 | B2 * | 4/2020 | Schmidt | H01R 43/26 | |
| 2008/0139029 | A1 | 6/2008 | Tsuji et al. | | |

FOREIGN PATENT DOCUMENTS

| | | | |
|---|---|---|---|
| JP | 2014-032915 | A | 2/2014 |
| JP | 2015-103378 | A | 6/2015 |
| WO | 2014/024575 | A1 | 2/2014 |

* cited by examiner

CONNECTOR

CROSS REFERENCE TO RELATED APPLICATIONS

This application is a national phase of PCT application No. PCT/JP2020/030294, filed on 7 Aug. 2020, which claims priority from Japanese patent application No. 2019-194020, filed on 25 Oct. 2019, all of which are incorporated herein by reference.

TECHNICAL FIELD

The present disclosure relates to a connector.

BACKGROUND

A connector described in Patent Document 1 is provided with a housing including a receptacle and a front holder to be mounted into the receptacle. Tabs of male terminal fittings are arranged to project into the receptacle. The front holder has a front wall to be inserted into the receptacle. A plurality of tab through holes are provided to be open in the front wall of the front holder.

The front holder moves from a partial locking position to a proper assembling position with respect to the housing by being pushed by a mating female connector inserted into the receptacle. At the partial locking position, tip parts of the tabs of the male terminal fittings are arranged in the tab through holes to position and protect the tabs. At the proper assembling position, the tip parts of the tabs project from the tab through holes and are connected to female terminal fittings mounted in the female connector. As just described, the front holder has a function as a moving plate for positioning the tabs of the male terminal fittings.

PRIOR ART DOCUMENT

Patent Document

Patent Document 1: JP 2003-282188 A

SUMMARY OF THE INVENTION

Problems to be Solved

For example, in the case of a connector including a small number of terminals, a receptacle is small in size. Thus, a moving plate (front holder in the case of Patent Document 1) to be inserted into the receptacle is also small in size. As a result, it becomes difficult to mold the moving plate. Even if the moving plate can be molded, the moving plate may not be smoothly movable in the receptacle.

Accordingly, the present disclosure aims to provide a connector having a function of protecting a male terminal and capable of coping with size reduction.

Means to Solve the Problem

The present disclosure is directed to a connector with a guide, a female housing being arranged inside the guide, a cavity located behind the guide and communicating with inside of the guide, a holding member arranged movably in a front-rear direction with respect to the guide, and a male terminal arranged inside the cavity and including a tab projecting forward, wherein the male terminal is provided to move integrally with the holding member.

Effect of the Invention

According to the present disclosure, it is possible to provide a connector having a function of protecting a male terminal and capable of coping with size reduction.

DETAILED DESCRIPTION TO EXECUTE THE INVENTION

Description of Embodiments of Present Disclosure

Figure 1:
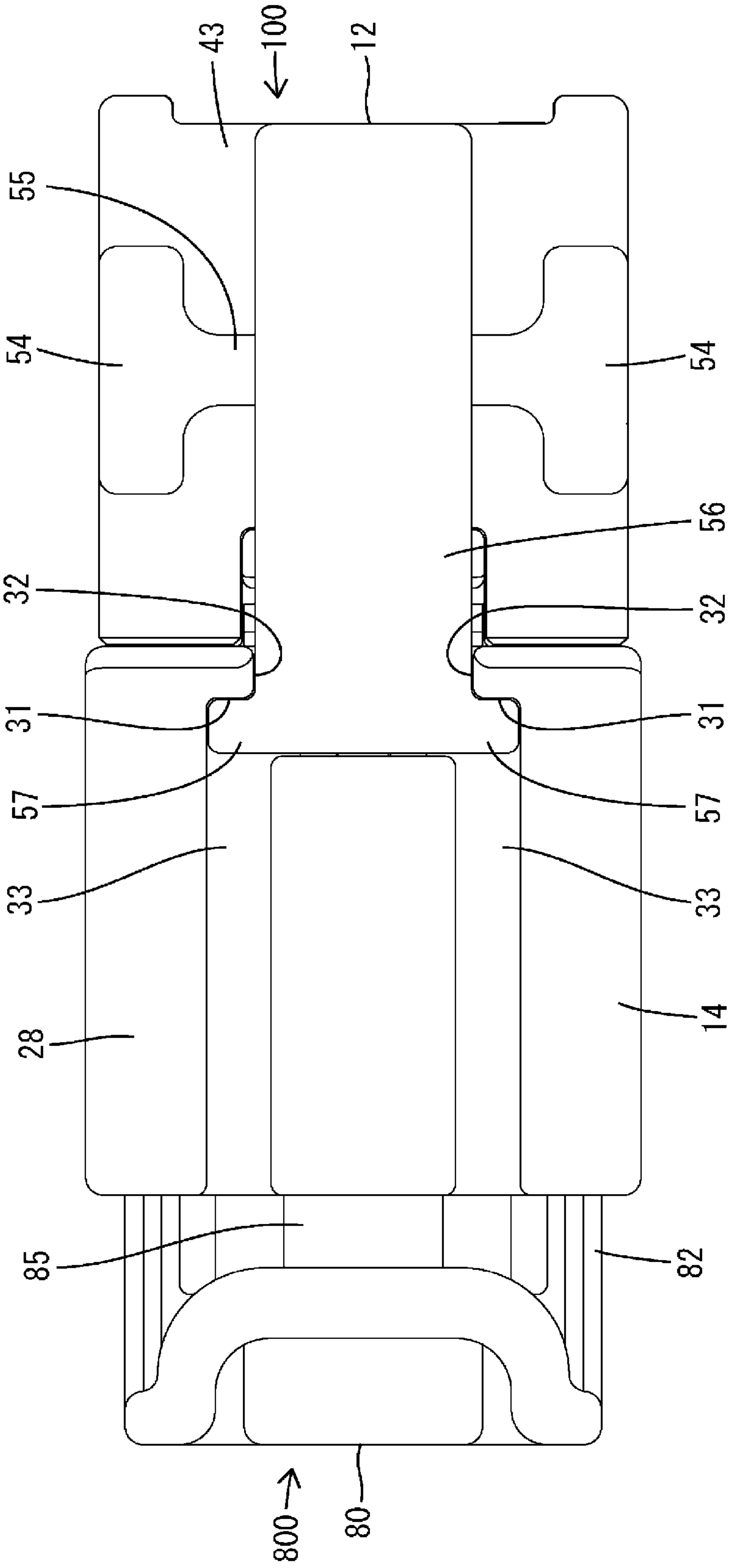
FIG. 1 is a plan view showing a state where male and female connectors are connected in an embodiment.

First, embodiments of the present disclosure are listed and described.

(1) The connector of the present disclosure includes a guide, a female housing being arranged inside the guide, a cavity located behind the guide and communicating with inside of the guide, a holding member arranged movably in a front-rear direction with respect to the guide, and a male terminal arranged inside the cavity and including a tab projecting forward, wherein the male terminal is provided to move integrally with the holding member. According to this configuration, when the holding member is located behind the guide, the tab of the male terminal can be arranged to be protected inside the cavity. If the holding member moves forward with respect to the guide, the male terminal also moves forward and the tab of the male terminal can be brought to the inside of the guide and connected to a female terminal in the female housing. Here, the holding member needs not be arranged inside the guide. Thus, the holding member is not restricted by the shape and size of the guide, unlike a conventional moving plate. Therefore, this configuration can also cope with small size connectors.

(2) Preferably, the guide and the cavity are provided in the housing, and the holding member is arranged movably to an initial position and a connection position forward of the initial position with respect to the housing. According to this configuration, when the holding member is at the initial position, the tab of the male terminal can be arranged to be protected inside the cavity. When the holding member is at the connection position, the tab of the male terminal can be connected to the female terminal in the female housing.

(3) The holding member may include an arm portion, the housing may include a front stop portion and the arm portion may be arranged to contact a rear surface of the front stop portion at the initial position. According to this configuration, the holding member can be prevented from inadvertently moving from the initial position to the connection position by the arm portion contacting the rear surface of the front stop portion.

(4) The housing may include a rear stop portion and the arm portion may be arranged to contact a front surface of the rear stop portion at the initial position. According to this configuration, the holding member can be prevented from inadvertently moving rearward toward a side opposite to the connection position from the initial position by the arm portion contacting the front surface of the rear stop portion. Particularly, the arm portion can have both a function of preventing a movement of the holding member to the connection position and a function of preventing a rearward movement of the holding member toward the opposite side.

(5) The arm portion may be arranged to contact the female housing in a separating direction of the female housing at the connection position. According to this configuration, when the holding member is at the connection position, the separation of the female housing from the holding member is restricted via the arm portion. Particularly, the arm portion can have a function of preventing a movement of the holding member to the connection position, a function of restricting the separation of the female housing and a function of preventing the holding member from moving rearward toward the side opposite to the connection position in the case of having the configuration of (4) described above. By this multi-functionalization of the arm portion, the structure of the holding member can be more simplified.

(6) The female housing may include a releasing portion for releasing a contact state of the arm portion with the rear surface of the front stop portion at a position facing the arm portion. According to this configuration, the contact state of the arm portion with the rear surface of the front stop portion can be released by the releasing portion as the female housing is arranged inside the guide. Therefore, it is not necessary to perform a special releasing operation of releasing the contact state of the arm portion with the rear surface of the front stop portion.

(7) The holding member may include a lock arm for locking the housing at the connection position. According to this configuration, when the holding member is at the connection position, the holding member and the housing can be kept in a held state via the lock arm.

Details of Embodiment of Present Disclosure

A specific example of a connector of the present disclosure is described below with reference to the drawings. Note that the present invention is not limited to these illustrations and is intended to be represented by claims and include all changes in the scope of claims and in the meaning and scope of equivalents.

The connector is composed of a female connector 800 and a male connector 100. The female connector 800 includes a female housing 80 and female terminals 81. The male connector 100 includes a housing 10, male terminals 11 and a holding member 12. The female connector 800 and the male connector 100 are connected to each other. The female terminals 81 and the male terminals 11 are electrically connected when the male and female connectors 100, 800 are connected. Note that, in the following description, surface sides facing each other when the connection of the male and female connectors 100, 800 is started are referred to as front sides concerning a front-rear direction. A vertical direction is based on a vertical direction of each figure except FIGS. 1, 11 and 12.

<Female Housing 80>

Figure 2:
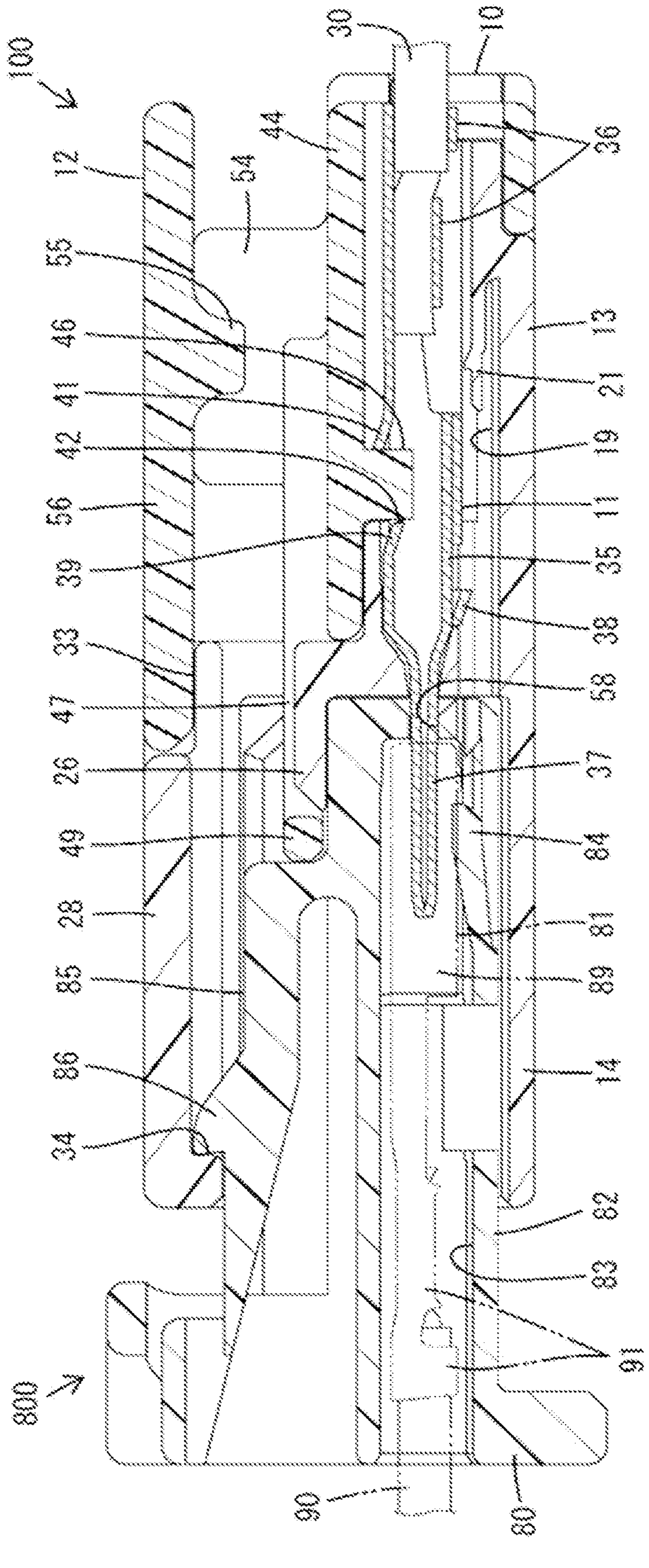
FIG. 2 is a side view in section showing the state where the male and female connectors are connected.
Figure 3:
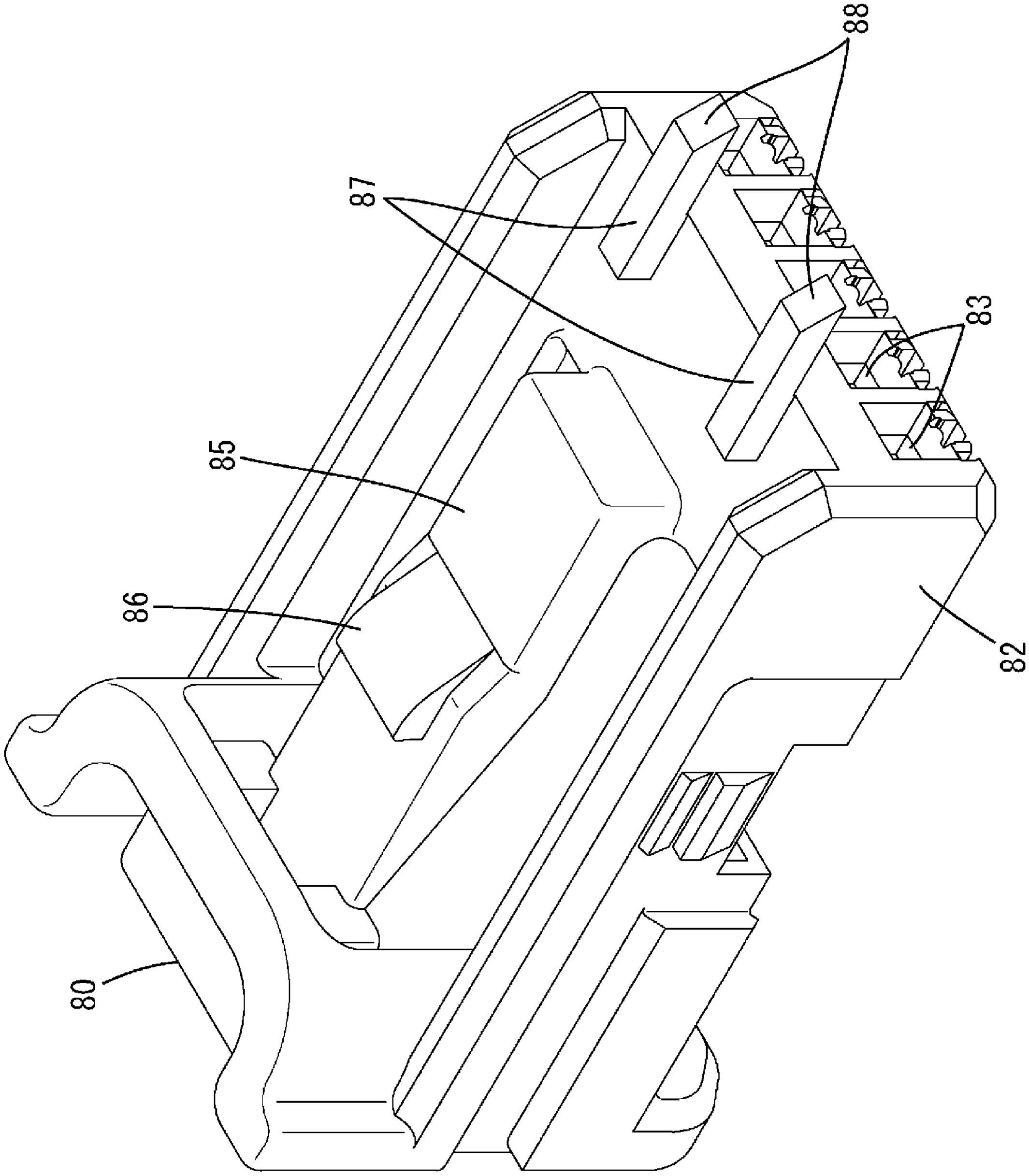
FIG. 3 is a perspective view of a female housing viewed obliquely from a front-upper side.

The female housing 80 is made of synthetic resin and includes, as shown in FIG. 3, a female housing body 82 in the form of a flat block extending in a width direction. The female housing body 82 includes a plurality of female cavities 83 arranged in a row in the width direction. Each female cavity 83 is a hole penetrating through the female housing body 82 in the front-rear direction. A deflectable and deformable female locking lance 84 is provided to project on an inner surface of each female cavity 83 as shown in FIG. 2.

As shown in FIG. 3, the female housing 80 includes a housing lock arm 85 projecting on the upper surface of the female housing body 82. The housing lock arm 85 is shaped to extend rearward from a front part of the upper surface of the female housing body 82. The housing lock arm 85 is vertically deflectable and deformable with a front side of the upper surface of the female housing body 82 as a fulcrum. A lock projection 86 is provided on the upper surface of the housing lock arm 85.

The female housing 80 includes a pair of releasing portions 87 projecting forward from the upper surface of the female housing body 82 while being spaced apart in the width direction. The both releasing portions 87 are in the form of rectangular columns long in the front-rear direction. Front parts of the both releasing portions 87 project further forward than the front surface of the female housing body 82. The front surfaces of the both releasing portions 87 are formed into releasing surfaces 88 linearly inclined to face upward. Rear parts of the both releasing portions 87 project like ribs on the upper surface of the female housing body 82. The rear surfaces of the both releasing portions 87 are arranged along the vertical direction.

<Female Terminals 81>

The female terminal 81 is formed into a shape elongated in the front-rear direction as shown in FIG. 2, such as by bending a conductive metal plate. The female terminal 81 includes a tubular connecting portion 89 and a female barrel portion 91 in the form of an open barrel connected behind the connecting portion 89. A later-described tab 37 of the male terminal 11 is inserted from front into the connecting portion 89 to be connected. The female barrel portion 91 is crimped into connection with an end part of a wire 90. The female terminal 81 is inserted into the female cavity 83 from behind. The connecting portion 89 is locked by the female locking lance 84, whereby the female terminal 81 is retained and arranged in the female cavity 83.

<Housing 10>

Figure 4:
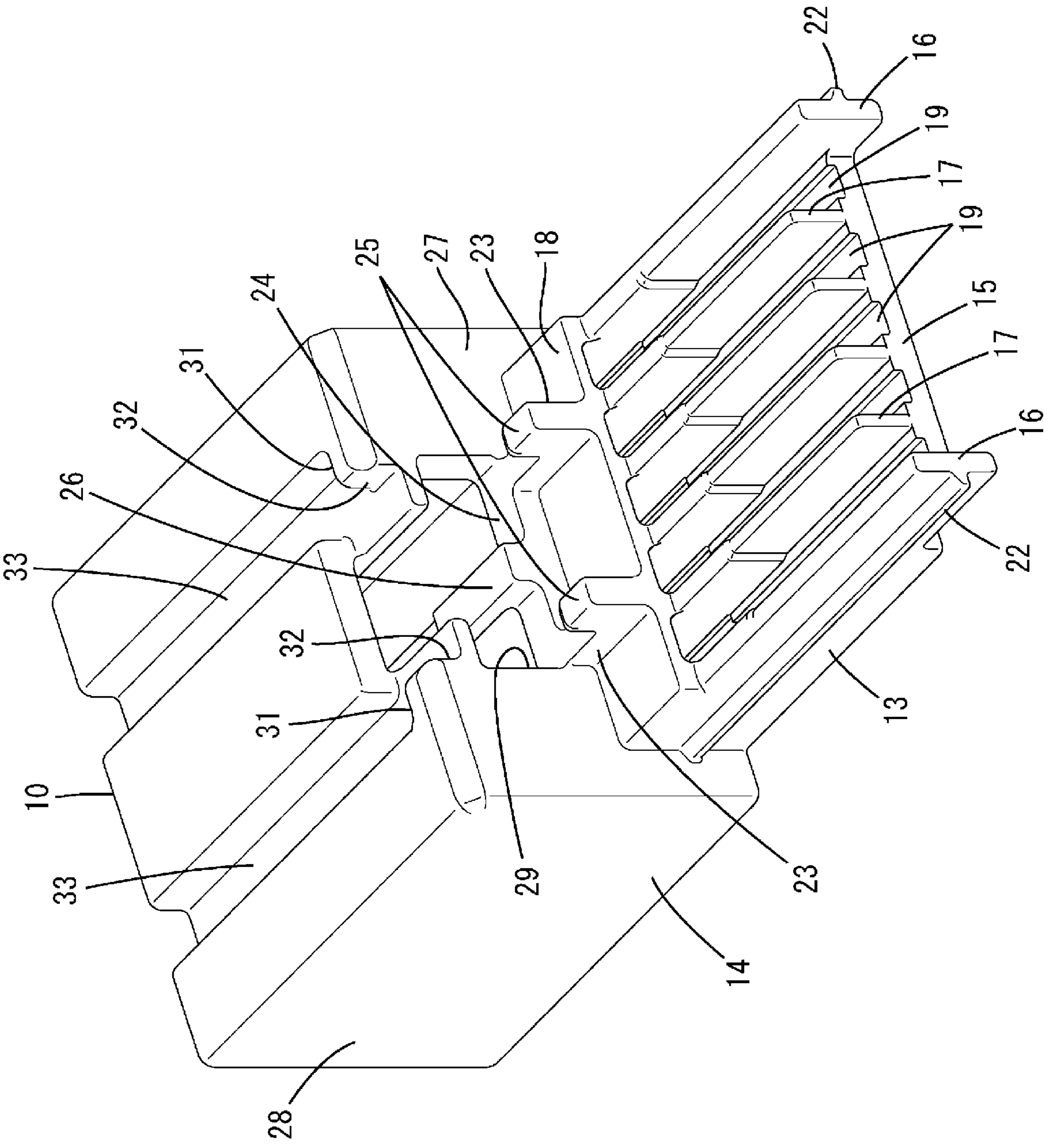
FIG. 4 is a perspective view of a housing viewed obliquely from a rear-upper side.

The housing 10 is made of synthetic resin and includes, as shown in FIG. 4, a housing body 13 and a guide 14 projecting forward from the housing body 13. The female housing 80 is inserted into the guide 14 from front.

The housing body 13 has a bottom wall 15 in the form of a rectangular flat plate, a pair of side walls 16 rising from both widthwise ends of the bottom wall 15 and a plurality of partition walls 17 arranged at intervals in the width direction on the upper surface of the bottom wall 15. The both side walls 16 and the respective partition walls 17 are in the form of plate pieces long in the front-rear direction. Further, the housing body 13 includes a coupling wall 18 in the form of a strip plate extending in the width direction between the upper ends of front parts of the both side walls 16. The coupling wall 18 is also coupled to the upper ends of front parts of the respective partition walls 17.

The housing body 13 includes a plurality of cavities 19 arranged in a row in the width direction. The respective cavities 19 are arranged between the partition walls 17 adjacent in the width direction and between the side walls 16 and the partition walls 17 facing the side walls 16. Each cavity 19 is open upward except a front end part covered by the coupling wall 18. Further, each cavity 19 extends in the front-rear direction, penetrates through a later-described back wall 27 of the guide 14 and communicates with the inside of the guide 14. A deflectable and deformable locking lance 21 is provided to project on an inner surface of each cavity 19 as shown in FIG. 2.

As shown in FIG. 4, a pair of locking portions 22 are provided to project on the outer side surfaces of the both side walls 16. The both locking portions 22 are in the form of ribs extending long in the front-rear direction.

Figure 11:
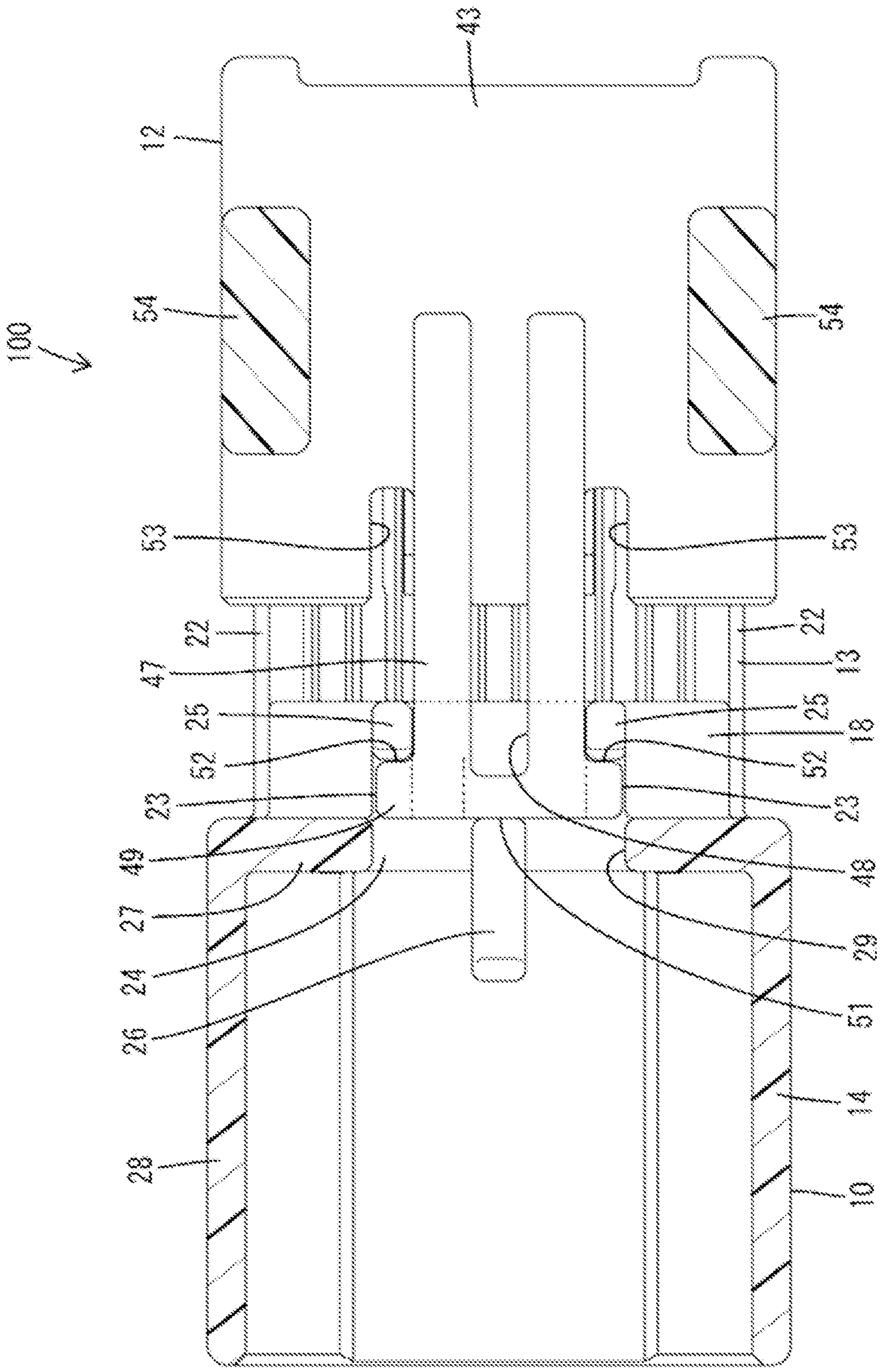
FIG. 11 is a plan view in section showing the state where the holding member is held at the initial position with respect to the housing.
Figure 12:
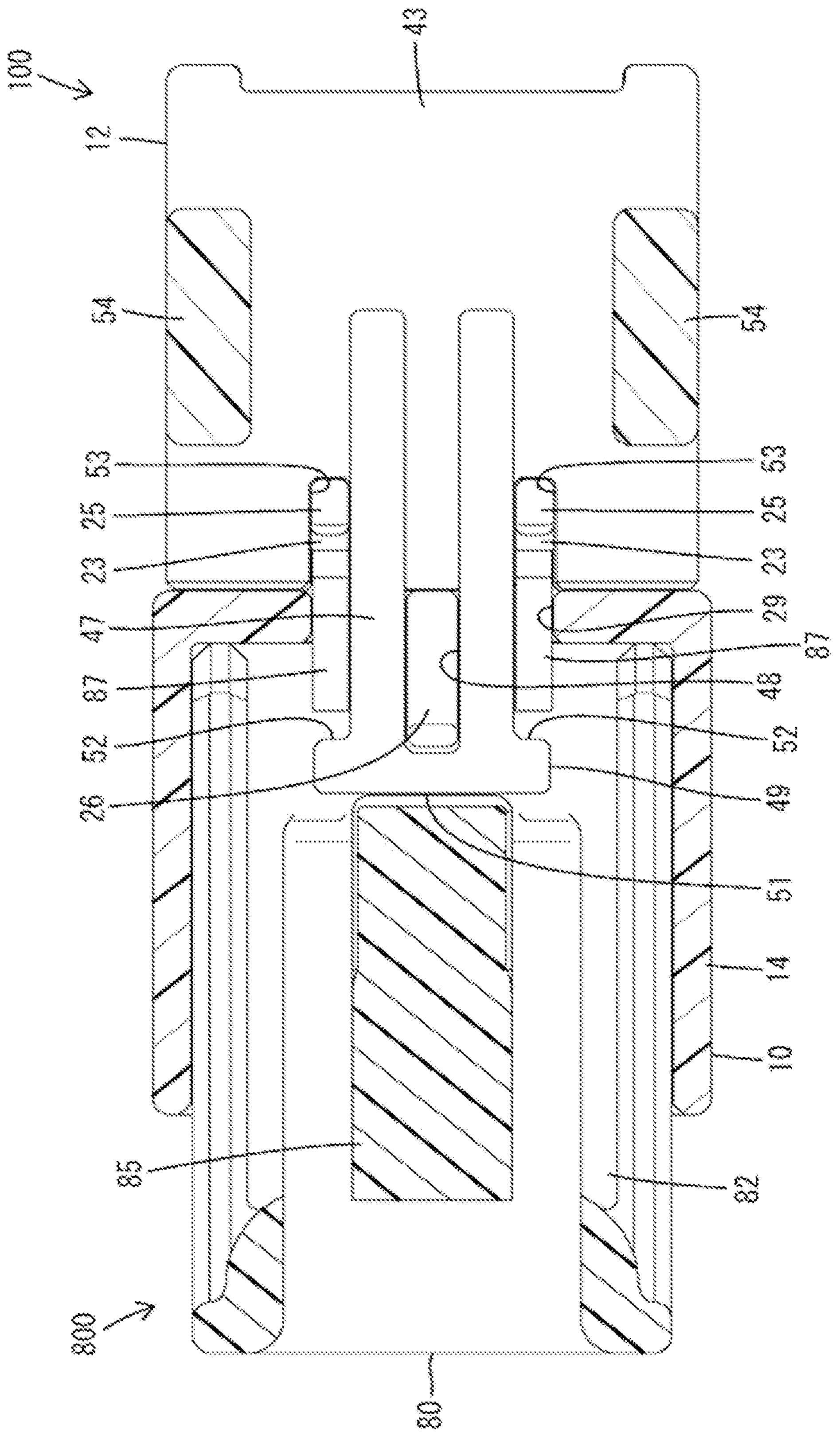
FIG. 12 is a plan view in section showing a state where the holding member is held at a connection position with respect to the housing after the connection of the male and female connectors.

As shown in FIGS. 4 and 11, the coupling wall 18 includes a pair of side seat portions 23 extending in the front-rear direction and spaced apart in the width direction in a widthwise central part of the upper surface and a front seat portion 24 linking between the front ends of the both side seat portions 23 and extending along the width direction. The both side seat portions 23 and the front seat portion 24 are formed into a gate shape in a plan view. The front seat portion 24 is arranged at the same position as the back wall 27 of the guide 14 in the front-rear direction. Both widthwise ends of the front seat portion 24 are coupled to the back wall 27. The upper surfaces of the both side seat portions 23 and the front seat portion 24 are flat surfaces flush and continuous with each other and arranged at a position higher than the upper surface of the coupling wall 18.

A pair of rear stop portions 25 are provided on rear end parts of the upper surfaces of the both side seat portions 23. The both rear stop portions 25 are in the form of rectangular columns and project upward from the upper surfaces of the both side seat portions 23. The front surfaces of the both rear stop portions 25 are arranged along the vertical direction.

Figure 8:
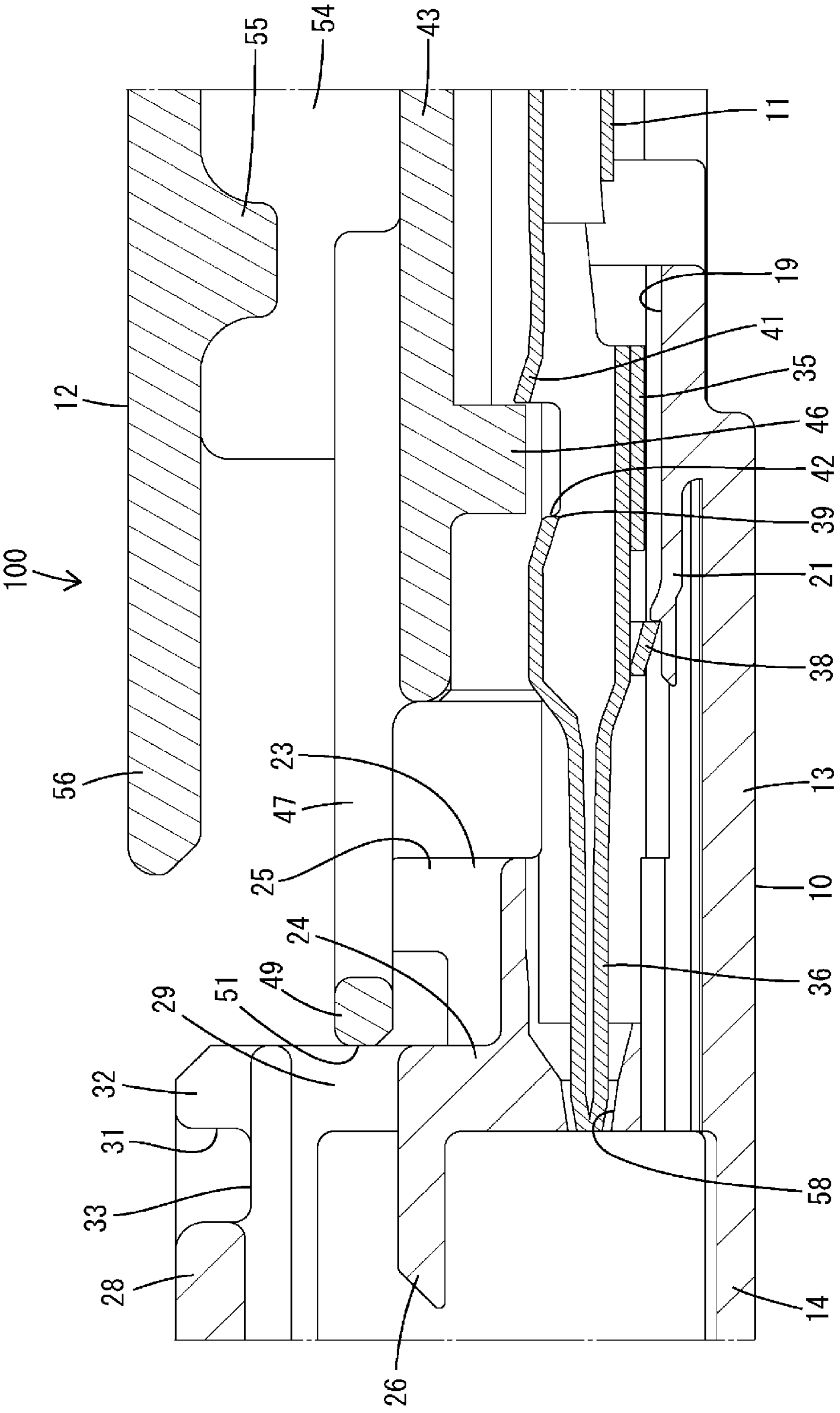
FIG. 8 is a partial enlarged side view in section showing the state where the holding member is held at the partial locking position with respect to the housing.
Figure 9:
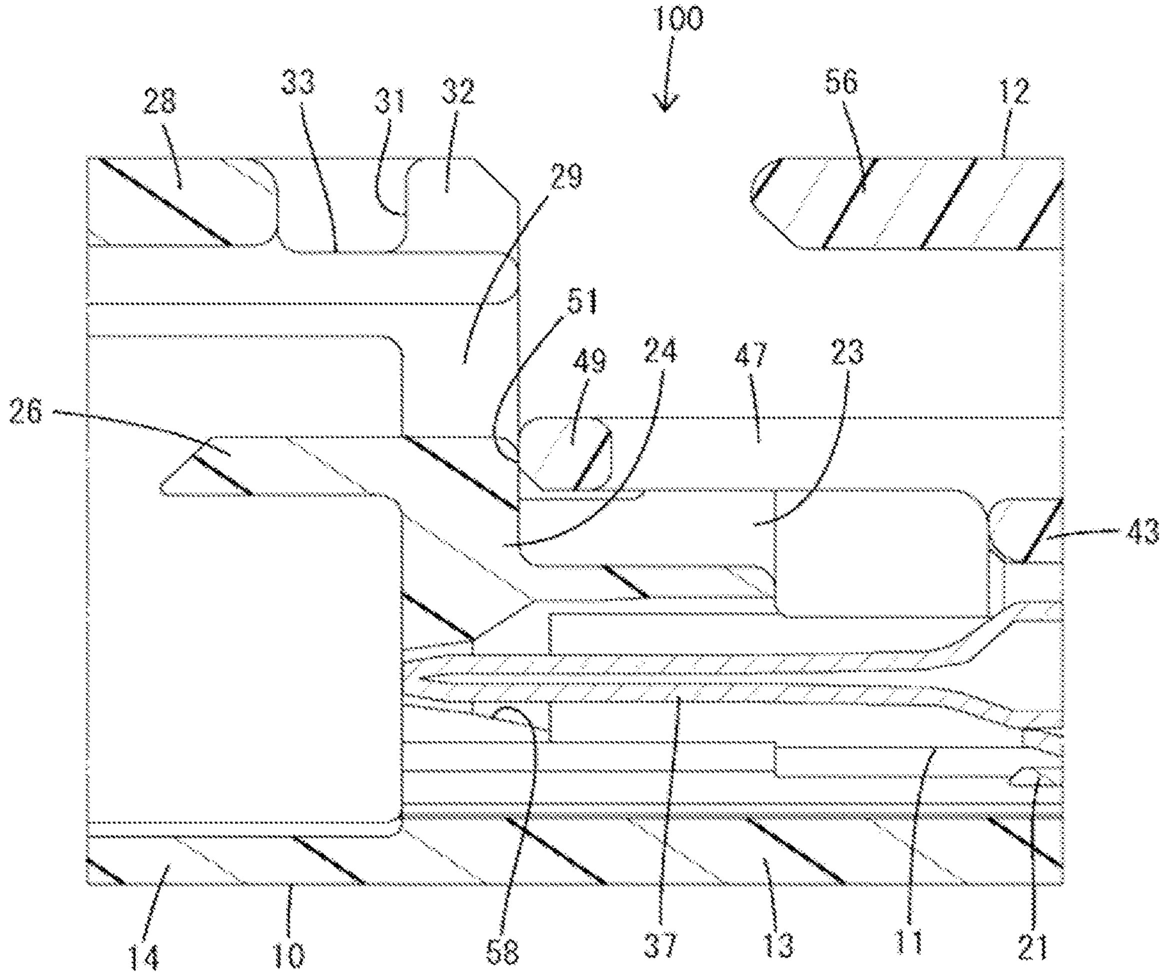
FIG. 9 is a partial enlarged side view in section showing a state where the holding member is held at an initial position with respect to the housing.

A front stop portion 26 is provided in a widthwise central part of the upper surface of the front seat portion 24. The front stop portion 26 is shaped to project upward from the upper surface of the front seat portion 24 and extend forward of the front seat portion 24. The front stop portion 26 projects into the guide 14 except a rear end part continuous with the upper surface of the front seat portion 24. As shown in FIGS. 8 and 9, the rear surface of the front stop portion 26 is flush and continuous with the rear surface of the front seat portion 24 and arranged along the vertical direction. The front surface of the front stop portion 26 is obliquely arranged to face upward.

As shown in FIG. 4, the guide 14 is in the form of a rectangular tube and has the back wall 27 arranged along the vertical direction and a peripheral wall 28 projecting forward from upper and lower end parts and both side end parts of the back wall 27. The back wall 27 includes a part coupled to the front end of the housing body 13 and protruding laterally of the both side walls 16 and upwardly of the coupling wall 18.

A through hole 29 open from a rear part of an upper wall part of the peripheral wall 28 to an upper part of the back wall 27 is provided in a widthwise central part of the guide 14. A rear end lower surface of the through hole 29 is closed by the front seat portion 24 and a rear end part of the front stop portion 26.

As shown in FIG. 1, a pair of lock receiving surfaces 31 are provided on both widthwise sides across the through hole 29 in a rear end part of an upper wall part of the peripheral wall 28. The both lock receiving surfaces 31 are arranged along the vertical direction to face forward. A pair of positioning surfaces 32 are provided on both widthwise sides across the through hole 29 in an upper part of the back wall 27. The both positioning surfaces 32 are arranged along the vertical direction to face each other inward. The front ends of the positioning surfaces 32 and the widthwise inner ends of the lock receiving surfaces 31 are orthogonal to each other.

As shown in FIG. 4, recessed surfaces 33 lowered from surroundings via the both positioning surfaces 32 and both lock receiving surfaces 31 are provided in the upper surface of the upper wall part of the peripheral wall 28. As shown in FIG. 1, a front end part of a later-described lock arm 56 of the holding member 12 is fit into an inner space defined by the recessed surfaces 33, the both positioning surfaces 32 and the both lock receiving surfaces 31, out of the upper wall part of the peripheral wall 28.

As shown in FIG. 2, a housing lock portion 34 projecting downward (inward) is provided on a front end part of the upper wall part of the peripheral wall 28. With the female housing 80 arranged in the guide 14, the housing lock arm 85 is locked to the housing lock portion 34.

<Male Terminals 11>

Figure 5:
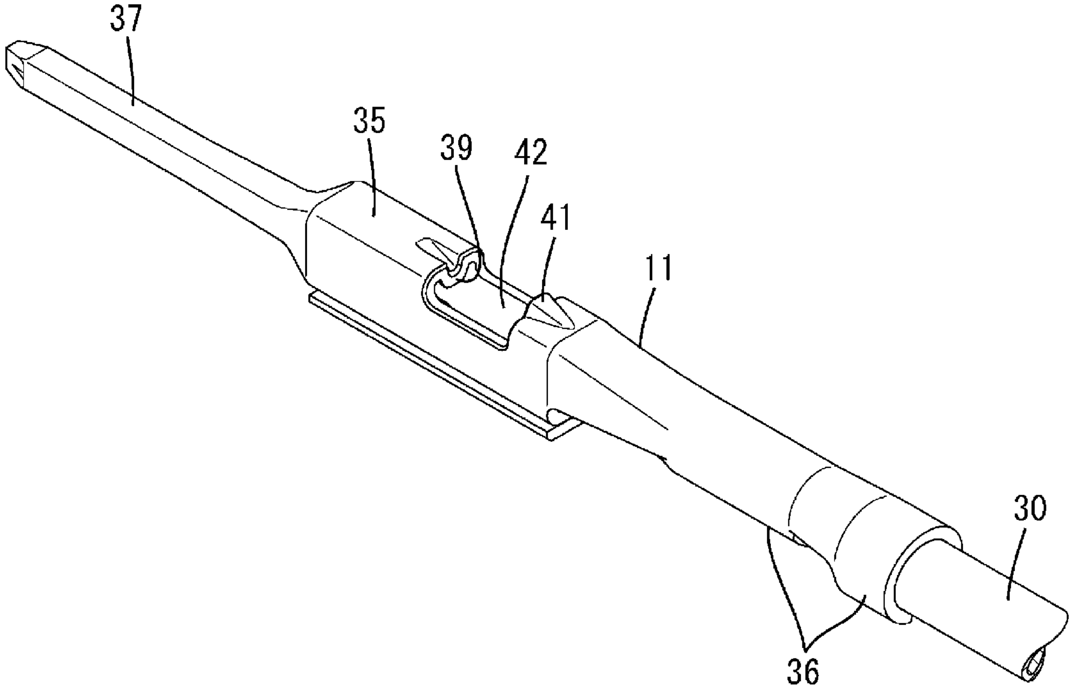
FIG. 5 is a perspective view of a male terminal viewed obliquely from a rear-upper side.

As shown in FIG. 5, the male terminal 11 is formed into a shape elongated in the front-rear direction, such as by bending a conductive metal plate. The male terminal 11 includes a tubular body portion 35, a barrel portion 36 in the form of an open barrel connected behind the body portion 35 and the tab 37 projecting forward from the body portion 35. The barrel portion 36 is crimped into connection with an end part of a wire 30.

As shown in FIG. 8, the body portion 35 includes a locking projection 38 projecting obliquely to a lower-rear side in a lower wall part. The locking projection 38 is formed by bending a part of a plate material constituting the lower wall part of the body portion 35 downward. The male terminal 11 is inserted into the cavity 19 from behind. The locking projection 38 of the body portion 35 is locked to the locking lance 21, whereby the male terminal 11 is retained and arranged in the cavity 19. Note that, as described later, the male terminal 11 relatively moves in the front-rear direction in the cavity 19 as the holding member 12 moves with respect to the housing 10.

The body portion 35 includes a front contact portion 39 projecting downward in the upper wall part. The front contact portion 39 is formed by bending a part of the plate material constituting the upper wall part of the body portion 35 downward. Further, the body portion 35 includes a rear contact portion 41 projecting upward behind the front contact portion 39 in the upper wall part. The rear contact portion 41 is formed by bending a part of the plate material constituting the upper wall part of the body portion 35 upward.

A hole portion 42 is provided to be open between the front and rear contact portions 39, 41 in the upper wall part of the body portion 35. The rear surface of the front contact portion 39 and the front surface of the rear contact portion 41 are arranged to face the hole portion 42. As shown in FIG. 2, a later-described holding protrusion 46 of the holding member 12 is inserted into the hole portion 42 of the body portion 35. The rear surface of the front contact portion 39 can contact the front surface of the holding protrusion 46. The front surface of the rear contact portion 41 can contact the rear surface of the holding protrusion 46.

<Holding Member 12>

Figure 6:
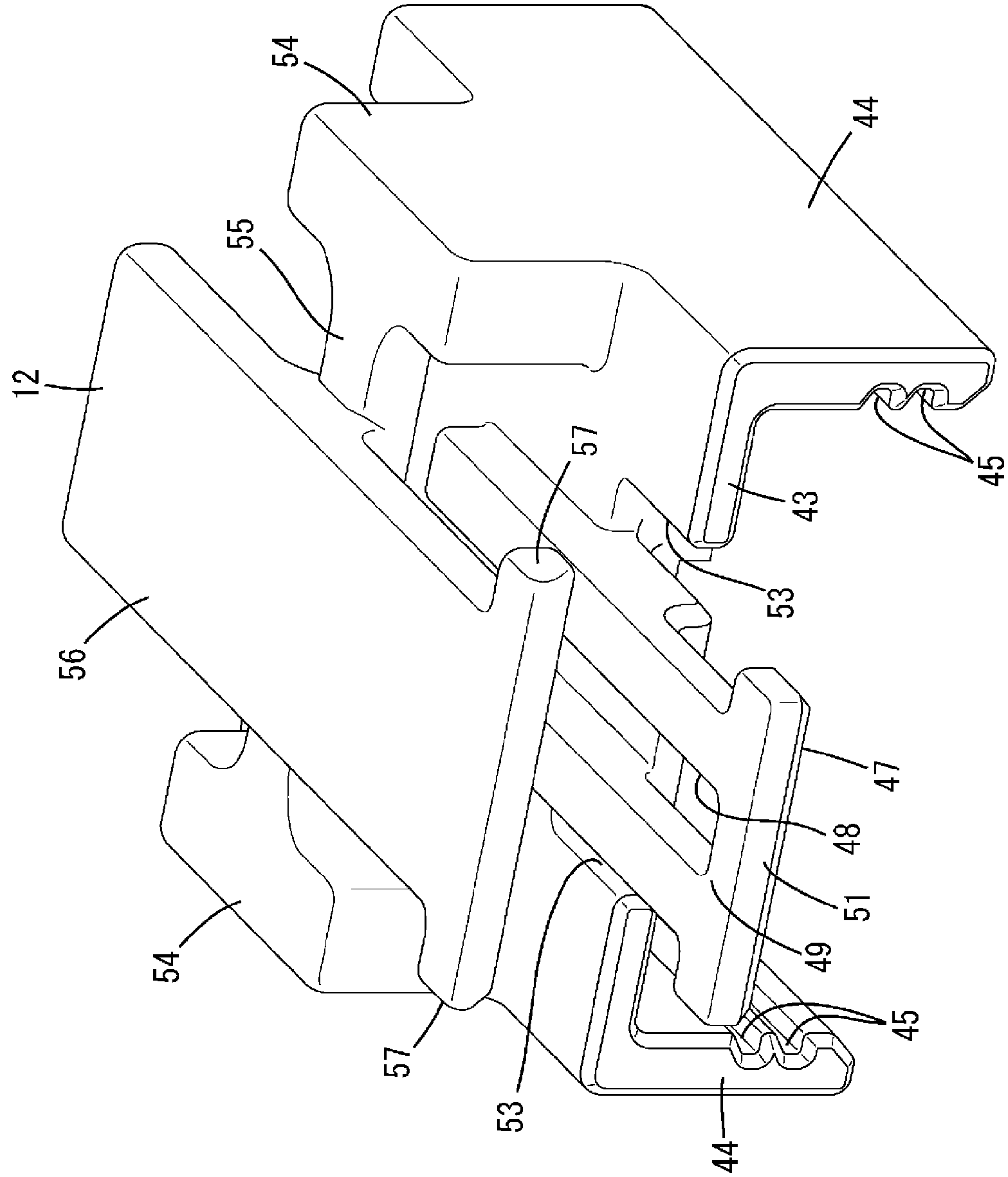
FIG. 6 is a perspective view of a holding member viewed obliquely from a front-upper side.

The holding member 12 is made of synthetic resin and includes, as shown in FIG. 6, a coupling plate portion 43 arranged along the width direction and a pair of side plate portions 44 projecting downward from both widthwise ends of the coupling plate portion 43. The coupling plate portion 43 and the both side plate portions 44 are formed into a gate shape. The holding member 12 is held vertically movable between a partial locking position and a full locking position and held movable in the front-rear direction between an initial position and a connection position with respect to the housing 10.

Figure 7:
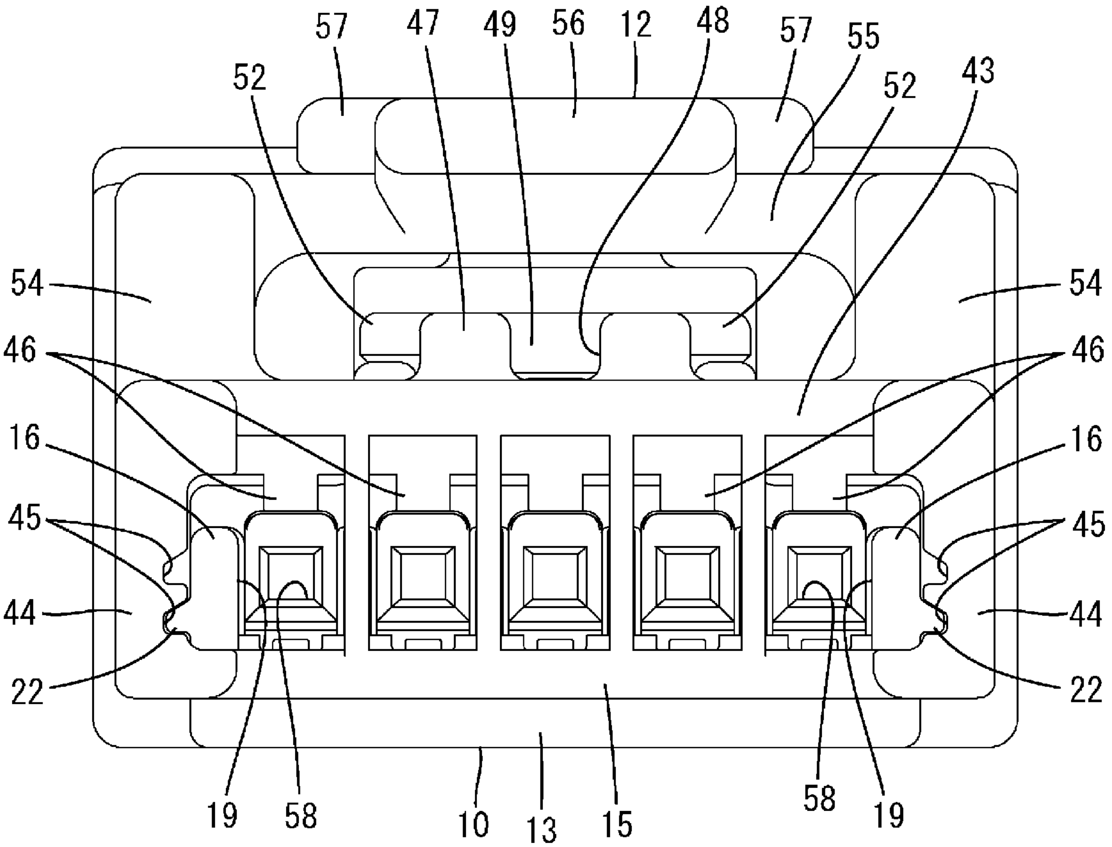
FIG. 7 is a back view showing a state where the holding member is held at a partial locking position with respect to the housing.

The both side plate portions 44 include a plurality of groove-like lock receiving portions 45 extending in the front-rear direction in inner surfaces. The respective lock receiving portions 45 are vertically paired on the both side plate portions 44. The locking portions 22 of the housing 10 are fit into the lock receiving portions 45. By arranging the both locking portions 22 in the lower lock receiving portions 45 as shown in FIG. 7, the holding member 12 is held at the partial locking position with respect to the housing 10 (housing body 13, guide 14). By arranging the both locking portions 22 in the upper lock receiving portions 45, the holding member 12 is held at the full locking position with respect to the housing 10. The holding member 12 is arranged on a relatively upper side at the partial locking position and arranged on a relatively lower side at the full locking position with respect to the housing 10.

The coupling plate portion 43 is in the form of a flat plate and arranged to cover upper surface openings of the respective cavities 19. As shown in FIG. 7, a plurality of the holding protrusions 46 are provided at positions corresponding to the respective cavities 19 on the inner surface of the coupling plate portion 43. The holding protrusion 46 is in the form of a rectangular block and provided in a size insertable into the hole portion 42 at a position corresponding to the hole portion 42 of the male terminal 11 as shown in FIG. 8. The front and rear surfaces of the holding protrusion 46 are both arranged along the vertical direction.

The holding member 12 includes an arm portion 47 projecting upward from the upper surface of the coupling plate portion 43 and extending forward of the coupling plate portion 43. The arm portion 47 is in the form of a strip plate and includes a receiving hole 48 in a widthwise central part. The receiving hole 48 extends in the front-rear direction and is open in the rear end of the arm portion 47 as shown in FIGS. 7 and 11. The arm portion 47 is vertically deflectable and deformable with a rear end part continuous with the upper surface of the coupling plate portion 43 as a fulcrum.

A front end part of the arm portion 47 is provided with a movement restricting portion 49 closing the front end of the receiving hole 48 and extending in the width direction. The front surface of the movement restricting portion 49 is arranged along the width direction and vertical direction. As shown in FIG. 11, the front surface of the movement restricting portion 49 has a front restricting surface 51 in a widthwise central part. The front restricting surface 51 is flush and continuous with adjacent regions on both widthwise sides on the front surface of the movement restricting portion 49 without having any special processing applied thereto. Both widthwise end parts of the movement restricting portion 49 protrude further laterally than a body part of the arm portion 47. The rear surfaces of the both widthwise end parts of the movement restricting portion 49 are configured as a pair of rear restricting surfaces 52. The both rear restricting surfaces 52 are arranged along the vertical direction.

As shown in FIG. 11, the rear surface of the front stop portion 26 of the housing 10 contacts the front restricting surface 51, thereby restricting the holding member 12 from moving from the initial position to the connection position with respect to the housing 10. The front surfaces of the both rear stop portions 25 contact the both rear restricting surfaces 52, thereby restricting a rearward movement of the holding member 12 from the initial position with respect to the housing 10. The holding member 12 is arranged on a relatively rear side at the initial position (see FIG. 11) and arranged on a relatively front side at the connection position (see FIG. 12) with respect to the housing 10.

The coupling plate portion 43 includes a pair of escaping holes 53 on both widthwise sides of the arm portion 47. The both escaping holes 53 extend in the front-rear direction and are open in the front end of the coupling plate portion 43. When the holding member 12 is moving to the connection position and at the connection position, the both side seat portions 23 are inserted into the both escaping holes 53 to escape.

Further, as shown in FIG. 6, the holding member 12 includes a pair of leg portions 54 rising from both widthwise ends of the coupling plate portion 43, a linking portion 55 extending in the width direction between the upper ends of the both leg portions 54 and the lock arm 56 coupled to a widthwise central part of the linking portion 55 and extending in the front-rear direction. The both leg portions 54 are in the form of rectangular ribs long in the front-rear direction. The linking portion 55 is shaped to have a rectangular cross-section and extend long in the width direction. Both widthwise ends of the linking portion 55 are coupled to central parts in the front-rear direction of the upper ends of the both leg portions 54.

The lock arm 56 is in the form of a strip plate long in the front-rear direction. The lock arm 56 is resiliently deformable (swingingly displaceable) like a seesaw with the linking portion 56 as a fulcrum. A pair of lock bodies 57 are provided to protrude laterally on both widthwise ends of a front end part of the lock arm 56. After resilient deformation, the lock arm 56 is locked in the guide 14 of the housing 10 with separation restricted by the both lock bodies 57 locking the both lock receiving surfaces 31 of the guide 14 as shown in FIG. 1.

<Assembling Structure and Assembling Method of Connector>

In assembling, the holding member 12 is arranged at the partial locking position with respect to the housing 10. At the partial locking position, the both locking portions 22 are fit in the lower lock receiving portions 45, whereby the holding member 12 is vertically positioned and held in the housing 10 (see FIG. 7). Each holding protrusion 46 is arranged to face each cavity 19 from above.

Subsequently, the male terminal 11 is inserted into each cavity 19 of the housing 10 from behind. In an insertion process of the male terminal 11, the front contact portion 39 passes below the holding protrusion 46. When the male terminal 11 reaches a proper insertion position, the rear contact portion 41 contacts the rear surface of the holding protrusion 46 to restrict any further forward movement of the male terminal 11 (see FIG. 8). Further, the locking projection 38 is locked to the locking lance 21, whereby a rearward movement of the male terminal 11 is also restricted. At this time, the tab 37 of the male terminal 11 is arranged in the cavity 19 and does not project into the guide 14. A tip part of the tab 37 is arranged in a tapered positioning hole 58 formed in the back wall 27 (see FIG. 9).

Subsequently, the holding member 12 is pushed down to reach the full locking position. At the full locking position, the both locking portions 22 are fit into the upper lock receiving portions 45, whereby the holding member 12 is vertically positioned and held in the housing 10. Each cavity 19 is formed into a hole closed over the entire periphery by having the upper surface opening closed by the coupling plate portion 43. Further, each holding protrusion 46 is lowered and deeply inserted into the body portion 35 of each male terminal 11 (see FIG. 2). Here, the front surface of the holding protrusion 46 is arranged to contact the front contact portion 39 from behind. Each male terminal 11 is arranged in the holding member 12 with forward and rearward movements restricted by each holding protrusion 46. In this way, each male terminal 11 becomes movable integrally with the holding member 12.

Further, the holding member 12 can reach the initial position at the same time as reaching the full locking position with respect to the housing 10. At the initial position, the both widthwise end parts of the movement restricting portion 49 are placed on the upper surfaces of the both side seat portions 23, the both rear restricting surfaces 52 are arranged to contact the front surfaces of the both rear stop portions 25, and the front restricting surface 51 is arranged to contact the rear surface of the front stop portion 26 (see FIG. 11). In this way, the holding member 12 is held in the housing 10 with forward and rearward movements restricted.

With the holding member 12 located at the full locking position and initial position with respect to the housing 10, the female housing 80 is inserted into the guide 14 of the housing 10 from front. The female terminals 81 are mounted in the female housing 80 in advance.

Figure 10:
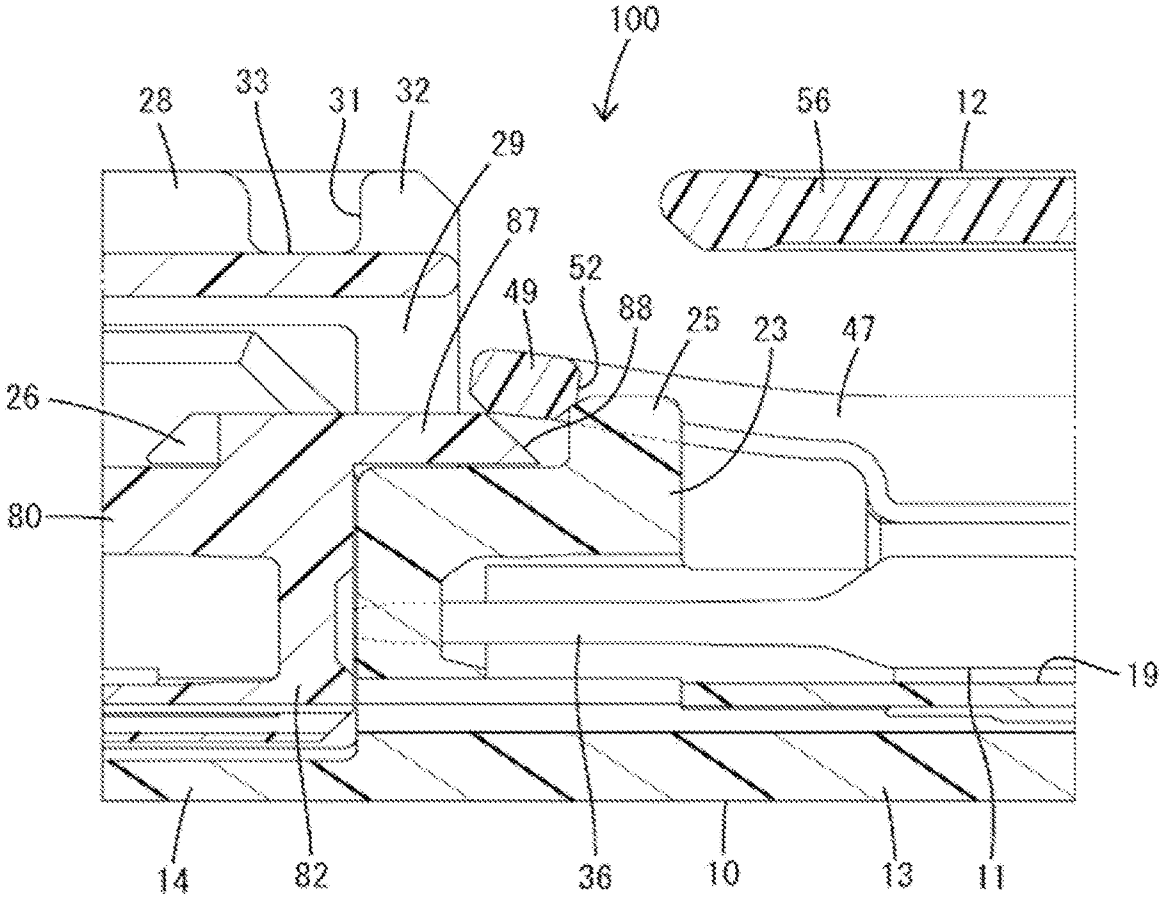
FIG. 10 is a partial enlarged side view in section showing a state where releasing portions push up a movement restricting portion to deflect and deform an arm portion.

When the female housing 80 is properly inserted into the guide 14, the both releasing portions 87 contact the front surfaces of the both widthwise end parts of the movement restricting portion 49 and the arm portion 47 rides on the releasing surfaces 88 of the both releasing portions 87 to be deflected and deformed upward (see FIG. 10). By the upward deflection and deformation of the arm portion 47, the front restricting surface 51 is separated from the rear surface of the front stop portion 26, thereby releasing a front stop state of the holding member 12. Here, the lock projection 86 of the housing lock arm 85 locks the rear surface of the housing lock portion 34 and the both housings 10, 80 are held in a properly connected state (separation restricted state).

Further, the holding member 12 becomes movable forward by releasing the front stop state of the holding member 12. In this state, the holding member 12 is pushed forward. In the process of moving the holding member 12 forward, each holding protrusion 46 contacts the rear end of each front contact portion 39 to press each male terminal 11 and each male terminal 11 moves forward together with the holding member 12. That is, each male terminal 11 moves relatively forward with respect to each cavity 19. In this way, the tab 37 of each male terminal 11 projects into the guide 14 through each positioning hole 58 and is inserted into the connecting portion 89 of the corresponding female terminal 81.

In the process of moving the holding member 12 forward, the both lock bodies 57 ride on both widthwise end parts of the upper surface of the back wall 27 and the lock arm 56 is deflected and deformed. When the holding member 12 reaches the connection position, the lock arm 56 resiliently returns, is placed on the recessed surfaces 33 and positioned in the width direction by the both positioning surfaces 32 (see FIG. 1). Further, the both lock bodies 57 lock the both lock receiving surfaces 31. In this way, the holding member 12 is held in the guide 14 and eventually in the housing 10 with separation restricted. The tab 37 of each male terminal 11 is inserted to a proper depth into the connecting portion 89 of each female terminal 81 and electrically connected to each female terminal 81.

In the process of moving the holding member 12 to the connection position, the both locking portions 22 slide on the inner surfaces of the upper lock receiving portions 45, thereby guiding a movement of the holding member 12 with respect to the housing 10. Further, in the process of moving the holding member 12 to the connection position, the both widthwise end parts of the movement restricting portion 49 ride on the upper surfaces of the both releasing portions 87 and slide on the upper surfaces of the both releasing portions 87 while the arm portion 47 is kept deflected and deformed. The arm portion 47 passes through the through hole 29 to be located in the guide 14. Further, the widthwise central part of the movement restricting portion 49 rides on the upper surface of the front stop portion 26 and slides on the upper surface of the front stop portion 26.

When the holding member 12 reaches the connection position, the arm portion 47 resiliently returns and is placed on the front seat portion 24 and the both side seat portions 23 and the front stop portion 26 is inserted into the receiving hole 48 of the arm portion 47. By the resilient return of the arm portion 47, the both rear restricting surfaces 52 of the movement restricting portion 49 are arranged to face the rear surfaces of the both releasing portions 87 (see FIG. 12). Thus, the holding member 12 and the female housing 80 are arranged while being restricted from being separated from each other.

In separating the both housings 10, 80 for maintenance or another reason, the rear end part of the lock arm 56 is pushed down and the holding member 12 is pulled rearward from that state. Then, the movement restricting portion 49 slides on the inclined front surface of the front stop portion 26 and the arm portion 47 is deflected and deformed upward. In this way, the movement restricting portion 49 is separated from the front surface of the front stop portion 26 and the rear surfaces of the both releasing portions 87 and the holding member 12 becomes movable rearward. In the process of moving the holding member 12 rearward, each holding protrusion 46 contacts the front end of each rear contact portion 41 to press each male terminal 11 and each male terminal 11 moves rearward together with the holding member 12. That is, each male terminal 11 moves relatively rearward with respect to each cavity 19.

When the holding member 12 returns to the initial position, the movement restricting portion 49 is fit between the front stop portion 26 and the both rear stop portions 25 to restrict a movement of the holding member 12. Further, each male terminal 11 is entirely arranged in each cavity 19. In this way, the tab 37 of each male terminal 11 is arranged to be protected in each cavity 19 again. Thereafter, the rear end part of the housing lock arm 85 is pushed down, thereby releasing a state where the housing lock arm 85 locks the housing lock portion 34. In that state, the both housings 10, 80 are pulled apart from each other.

As described above, according to this embodiment, the tabs 37 of the male terminals 11 can be arranged to be protected inside the cavities 19 when the holding member 12 is at the initial position. If the holding member 12 moves forward with respect to the housing 10, the male terminals 11 also move forward and the tabs 37 of the male terminals 11 can be brought to the inside of the guide 14 and connected to the female terminals 81. Since the holding member 12 is not entirely arranged in the guide 14, the holding member 12 is not restricted by the shape and size of the guide 14. Thus, this embodiment can also cope with small size connectors including a small number of terminals.

Here, when the holding member 12 is at the initial position, the front restricting surface 51 of the arm portion 47 contacts the rear surface of the front stop portion 26, whereby the holding member 12 can be prevented from inadvertently moving from the initial position to the connection position. By the contact of the both rear restricting surfaces 52 of the arm portion 47 and the front surfaces of the both rear stop portions 25, the holding member 12 can be prevented from inadvertently moving rearward toward a side opposite to the connection position from the initial position. Further, when the holding member 12 is at the connection position, the both rear restricting surfaces 52 of the arm portion 47 contact the rear surfaces of the both releasing portions 87, whereby the female housing 80 can be restricted from being separated from the holding member 12 (eventually the housing 10).

As described above, the arm portion 47 is multi-functionalized. Thus, the structure of the holding member 12 can be simplified as compared to the case where a plurality of functions of the arm portion 47 are individually provided in the holding member 12. Further, the both releasing portions 87 contact the movement restricting portion 49 of the arm portion 47 to release the front stop state of the holding member 12. Thus, it is not necessary to perform a special releasing operation of releasing the front stop state of the holding member 12. Further, when the holding member 12 is at the connection position, the holding member 12 and the housing 10 can be kept in a held state via the lock arm 55 different from the arm portion 47.

Other Embodiments of Present Disclosure

The embodiment disclosed this time should be considered illustrative in all aspects, rather than restrictive.

Although the guide is formed into a tubular shape to surround the female housing over the entire periphery in the case of the above embodiment, the guide may be shaped to have a circumferentially open part as another embodiment.

Although the holding member is held at the partial locking position and full locking position with respect to the housing in the case of the above embodiment, the holding member may not be held at the partial locking position with respect to the housing and may not have a partial locking structure (lower lock receiving portions, etc. in the case of the above embodiment) as another embodiment.

Although the guide and the cavities are integrally provided in the housing in the case of the above embodiment, the guide and the cavities may be separately provided to be movable relative to each other (separable) as another embodiment. For example, the cavities may be provided in the holding member.

LIST OF REFERENCE NUMERALS

10 . . . housing
11 . . . male terminal
12 . . . holding member
13 . . . housing body
14 . . . guide
15 . . . bottom wall
16 . . . side wall
17 . . . partition wall
18 . . . coupling wall
19 . . . cavity
21 . . . locking lance
22 . . . locking portion
23 . . . side seat portion
24 . . . front seat portion
25 . . . rear stop portion
26 . . . front stop portion
27 . . . back wall
28 . . . peripheral wall
29 . . . through hole
30 . . . wire connected to male terminal
31 . . . lock receiving surface
32 . . . positioning surface
33 . . . recessed surface
34 . . . housing lock portion
35 . . . body portion
36 . . . barrel portion
37 . . . tab
38 . . . locking projection
39 . . . front contact portion
41 . . . rear contact portion
42 . . . hole portion
43 . . . coupling plate portion
44 . . . side plate portion
45 . . . lock receiving portion
46 . . . holding protrusion
47 . . . arm portion
48 . . . receiving hole
49 . . . movement restricting portion
51 . . . front restricting surface
52 . . . rear restricting surface
53 . . . escaping hole
54 . . . leg portion
55 . . . linking portion
56 . . . lock arm
57 . . . lock body
58 . . . positioning hole
80 . . . female housing
81 . . . female terminal
82 . . . female housing body
83 . . . female cavity
84 . . . female locking lance
85 . . . housing lock arm
86 . . . lock projection
87 . . . releasing portion
88 . . . releasing surface
89 . . . connecting portion
90 . . . wire connected to female terminal
91 . . . female barrel portion
100 . . . male connector
800 . . . female connector

What is claimed is:

1. A connector, comprising:

a housing body;

a guide projecting forward from the housing body, a female housing being arranged inside the guide;

a cavity provided in the housing body, located behind the guide, communicating with inside of the guide and including an opening in one surface of the housing body;

a holding member arranged movably in a front-rear direction with respect to the guide and the housing body while covering the opening of the cavity; and a male terminal arranged inside the cavity and including a tab projecting forward and a body portion including a front contact portion projecting downward in an upper wall part, a rear contact portion projecting upward behind the front contact portion in the upper wall part, and a hole portion open between the front and rear contact portions in the upper wall part, wherein:

the holding member includes a coupling plate portion, the coupling plate portion includes a holding protrusion at a position corresponding to the cavity, and the cavity is formed into a hole closed around by having the opening closed by the coupling plate portion, and a rear surface of the front contact portion contacts a front surface of the holding protrusion, and a front surface of the rear contact portion contacts a rear surface of the holding protrusion when the holding protrusion is inserted into the hole portion of the body portion, and the male terminal is capable of relatively moving back and forth with respect to the cavity together with the holding member.

2. The connector of claim 1, wherein:

the guide and the cavity are provided in the housing, and the holding member is arranged movably to an initial position and a connection position forward of the initial position with respect to the housing.

3. The connector of claim 1, wherein the front and rear surfaces of the holding protrusion are both arranged along a vertical direction.

4. A connector, comprising:

a guide, a female housing being arranged inside the guide;

a cavity located behind the guide and communicating with inside of the guide;

a holding member arranged movably in a front-rear direction with respect to the guide; and a male terminal arranged inside the cavity and including a tab projecting forward, wherein:

the male terminal is provided to move integrally with the holding member, the guide and the cavity are provided in the housing, the holding member is arranged movably to an initial position and a connection position forward of the initial position with respect to the housing, the holding member includes an arm portion, the housing includes a front stop portion and the arm portion is arranged to contact a rear surface of the front stop portion at the initial position, and the female housing includes a releasing portion for releasing a contact state of the arm portion with the rear surface of the front stop portion at a position facing the arm portion.

* * * * *